United States Patent
Sakakibara et al.

(10) Patent No.: US 6,936,322 B2
(45) Date of Patent: Aug. 30, 2005

(54) OPTICAL ELEMENT, AND MANUFACTURING METHOD THEREOF

(75) Inventors: Youichi Sakakibara, Tsukuba (JP); Madoka Tokumoto, Tsukuba (JP); Satoshi Tatsuura, Ashigarakami-gun (JP); Yohji Achiba, Jama (JP); Hiromichi Kataura, Hadinogi (JP)

(73) Assignee: National Institute of Advanced Industrial Science and Technology, (JP)

( * ) Notice: Subject to any disclaimer, the term of this patent is extended or adjusted under 35 U.S.C. 154(b) by 0 days.

(21) Appl. No.: 10/492,751

(22) PCT Filed: Oct. 17, 2002

(86) PCT No.: PCT/JP02/10794

§ 371 (c)(1),
(2), (4) Date: Nov. 8, 2004

(87) PCT Pub. No.: WO03/034142

PCT Pub. Date: Apr. 24, 2003

(65) Prior Publication Data

US 2005/0069669 A1    Mar. 31, 2005

(51) Int. Cl.$^7$ ................................................. B32B 3/02

(52) U.S. Cl. .................... 428/64.1; 428/64.4; 359/298; 385/18

(58) Field of Search .............................. 428/64.1, 64.4, 428/913; 430/270.11, 495.1, 945; 359/298; 385/18

(56) References Cited

U.S. PATENT DOCUMENTS

| | | | |
|---|---|---|---|
| 5,315,573 A | 5/1994 | Nakao et al. | |
| 5,474,874 A | 12/1995 | Asai et al. | |
| 5,502,737 A | 3/1996 | Chartier et al. | |
| 5,862,286 A | 1/1999 | Imanishi et al. | |
| 6,124,966 A | 9/2000 | Yokoyama | |
| 6,271,960 B1 | 8/2001 | Michishita et al. | |
| 6,782,154 B2 * | 8/2004 | Zhao et al. | 385/16 |
| 6,806,996 B2 * | 10/2004 | Tatsuura et al. | 359/298 |
| 2005/0017251 A1 * | 1/2005 | Vinciguerra et al. | 257/79 |

FOREIGN PATENT DOCUMENTS

EP   1056169 A2   11/2000

(Continued)

OTHER PUBLICATIONS

Kataura, H. et al., "Optical Properties of Single-Wall Carbon Nanotubes", Synthetic Metals, 1999, vol. 103, p. 2555-2558.

(Continued)

Primary Examiner—Elizabeth Mulvaney
(74) Attorney, Agent, or Firm—Brown Raysman Millstein Felder & Steiner

(57) ABSTRACT

An optical element according to the present invention has a thin film, in which single-wall carbon nanotubes are laminated, and utilizes a saturable absorption function of the single-wall carbon nanotubes. Further, in a method for producing the optical element according to the present invention, the thin film is formed by spraying, to a body to be coated, a dispersion liquid prepared by dispersing the single-wall carbon nanotubes in a dispersion medium. Accordingly, a nonlinear optical element, which can operate in an optical communication wavelength region and which is extremely inexpensive and efficient, and a method for producing the optical element can be provided.

19 Claims, 8 Drawing Sheets

FOREIGN PATENT DOCUMENTS

| | | |
|---|---|---|
| EP | 1079483 A2 | 2/2001 |
| EP | 1087553 A1 | 3/2001 |
| JP | 05-142592 | 11/1993 |
| JP | 11-015031 | 1/1999 |
| JP | 2000-058976 | 2/2000 |
| WO | WO 00/45480 | 3/2000 |

OTHER PUBLICATIONS

Sun, Ya-Ping et al., "Nanomaterials as Optical Limiters", Journal of Nonlinear Optical Physics & Materials, 2000, vol. 9, No. 4, p. 481-503.

Vivien, L. et al., "Pump-Probe Experiments at 1064 nm in Singlewall Carbon Nanotube Suspensions", IEEE Journal of Quantum Electronics, Jun. 2000, vol. 36, No. 6, p. 680-686.

Vivien, L. et al., "Pulse Duration and Wavelength Effects on the Optical Limiting Behavior of Carbon Nanotube Suspensions", Optics Letters, Feb. 15, 2001, vol. 26, No. 4, p. 223-225.

Margulis, V.A. et al., "Theoretical Modelling of Nonlinear Refraction and Two-Photon Absorption in Single-Wall Carbon Nanotube Bundles", Journal of Optics A, Jul. 2001, vol. 3, No. 4, p. 267-275.

\* cited by examiner

SAMPLE NAME: SWNT
COMMENT: nanotube
SCAN SPEED: 300(750)nm/min; SLIT(VISIBLE): FIXED 5.00nm
SLIT(INFRARED): AUTOMATIC CONTROL
PHOTOMULTIPLIER VOLTAGE: AUTOMATIC CONTROL
Pbs SENSITIVITY: 2; BASE LINE: USER 2
SAMPLING INTERVAL: AUTOMATIC SETTING F I G. 3
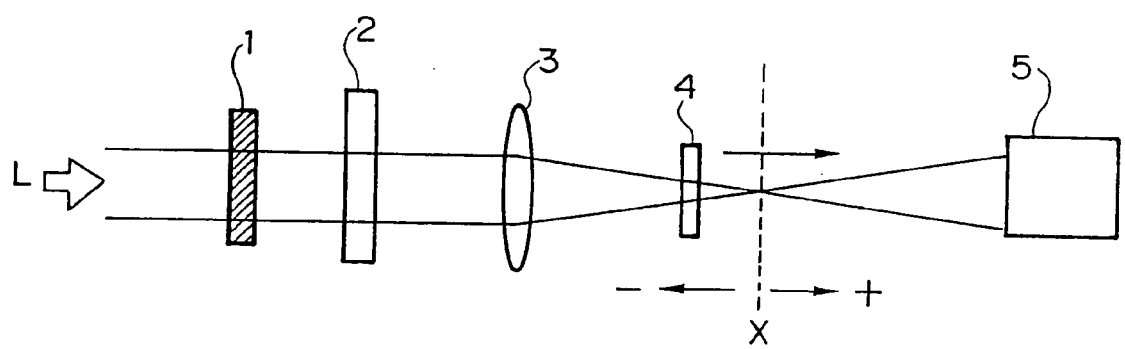

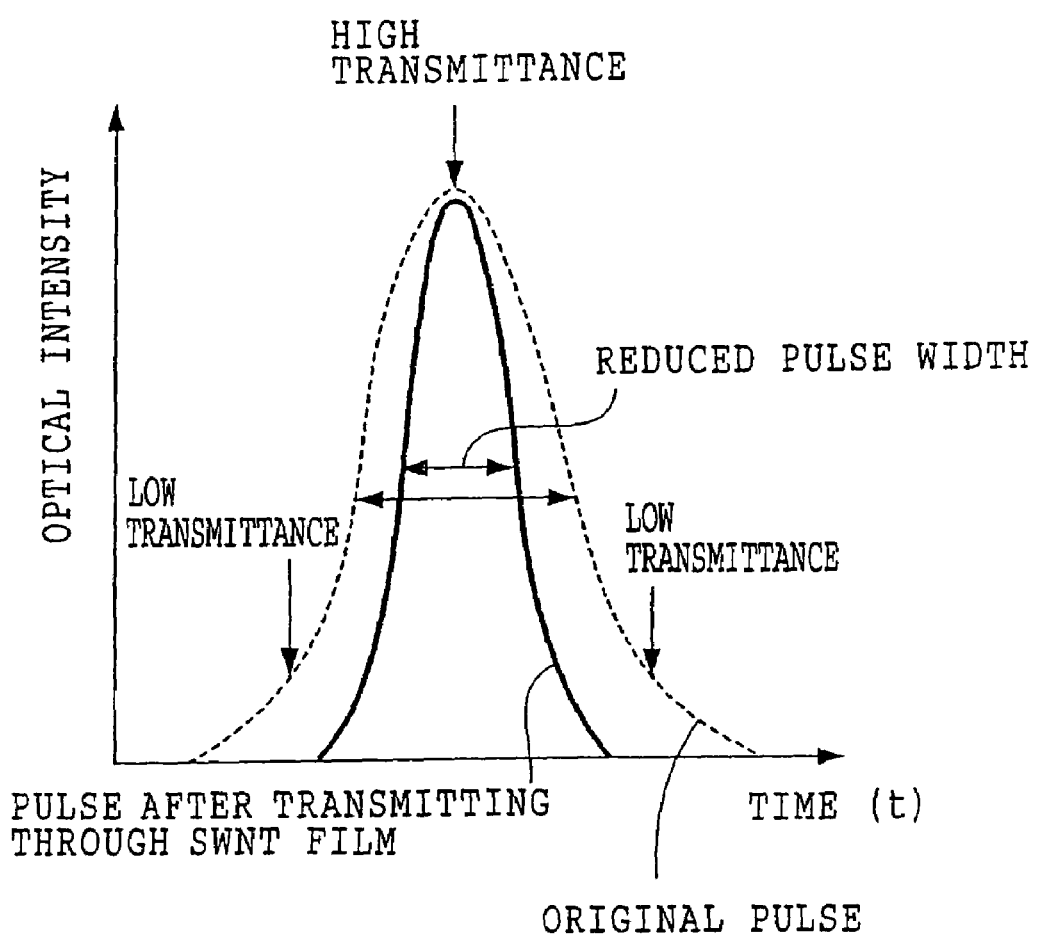
F I G. 7

US 6,936,322 B2

OPTICAL ELEMENT, AND MANUFACTURING METHOD THEREOF

TECHNICAL FIELD

The present invention relates to an optical element (an optical device), which can control light in an optical communication wavelength region by utilizing a saturable absorption function of single-wall carbon nanotubes, and to a method for producing the optical element.

BACKGROUND ART

A carbon nanotube discovered recently is a tubular material, which is ideally formed with a sheet structure of a hexagonal carbon lattice (a graphene sheet) parallel to an axis of the tube. Further, the carbon nanotube may be a multi-layered tube formed with plural sheets mentioned above. In theory, the carbon nanotube is expected to exhibit a metallic or semiconducting property depending upon the connection type of the hexagonal carbon lattice and the diameter of the tube, and is expected as a future functional material.

A material having a diameter of 1 µm or less, which is thinner than a carbon fiber, is commonly referred to as a carbon nanotube, and is thereby distinguished from the carbon fiber. However, there is no specifically clear border therebetween. In a restricted meaning, a tube formed with a graphene sheet of a hexagonal carbon lattice parallel to an axis of the tube is referred to as a carbon nanotube. (This restricted meaning is applied to a carbon nanotube in the present invention.)

In general, the carbon nanotube defined by the restricted meaning is further classified. A tube formed with a sheet of a hexagonal carbon lattice is referred to as a single-wall carbon nanotube (hereinafter, sometimes simply referred to as an "SWNT"), and a multi-layered tube formed with plural sheets of a hexagonal carbon lattice is referred to as a multiwall carbon nanotube (hereinafter, sometimes simply referred to as an "MWNT"). The method and conditions of synthesis determine, to some extent, the structure of the carbon nanotube to be obtained.

In particular, the SWNT has attractive diversity exhibiting a metallic or semiconducting property in accordance with a chiral vector, and thus has been principally considered to be applied to an electric and electronic element (see, for example, "Basics of Carbon Nanotube" authored by Yahachi Saito and Syunji Bando (1998), Corona Publishing Co., Ltd.). An attempt to improve the property of a field emitting element by utilizing the efficient field electron emission property is in the advanced stage (see, for example, K. Matsumoto et al., Extended Abstracts of the 2000 International Conference on Solid State Devices and Materials (2000), pp. 100–101). However, the SWNT has not been sufficiently studied so far with respect to optical applications.

In the case of application to an electric and electronic element, a minute probe can access a single carbon nanotube. On the other hand, in the case of optical application, access is principally made to bulk carbon nanotubes by using a luminous flux condensed to a diameter of several hundreds of nm to several tens of µm. The primary reasons for the delay in optical application of the SWNT as compared with electric and electronic element applications may be due to the difficulty in obtaining a high purity sample of the SWNT required for optical evaluation, and the difficulty in forming an optically uniform film as the SWNT is hard to dissolve in solvents. There is a report of evaluation of a nonlinear optical constant aimed at optical application of the SWNT. However, in this report, an SWNT in a solution state is evaluated at 1,064 nm, 532 nm and 820 nm, which are not in a resonant region, and there is no report of remarkable nonlinearity that promises practical use (X. Liu et al., Appl. Phys. Lett. 74 (1999), pp. 164–166; Z. Shi et al., Chem. Commun. (2000), pp. 461–462).

The SWNT is known to have absorption at a wavelength of 1.8 µm, which is in an optical communication wavelength region (1.2 to 2 µm) (H. Kataura et al., Synth. Met. 103 (1999), pp. 2555–2558). If the resonant effect in this absorption band can be directly utilized, remarkable nonlinearity can be realized in a band of these wavelengths.

On the basis of the above-described consideration, we have studied application of the SWNT to an optical element operating in an optical communication wavelength region.

DISCLOSURE OF THE INVENTION

In order to solve the above-described problems, an optical element (an optical device) according to the present invention has a thin film, in which single-wall carbon nanotubes are laminated, and utilizes a saturable absorption function of the single-wall carbon nanotubes.

In a method for producing the optical element (the optical device) according to the present invention, the thin film is formed by spraying, to a body to be coated, a dispersion liquid prepared by dispersing the single-wall carbon nanotubes in a dispersion medium.

BRIEF DESCRIPTION OF THE DRAWINGS

FIG. 3 is a schematic setup for explaining a Z-scan method.

FIG. 7 is a graph for explaining the principle of waveform shaping in a case where the optical element of the present invention is used as a waveform shaper having a function of waveform shaping, wherein time is plotted in the abscissa axis and the optical intensity of an incident light pulse is plotted in the ordinate axis.

MOST PREFERRED EMBODIMENTS FOR IMPLEMENTING THE INVENTION

Figure 1:
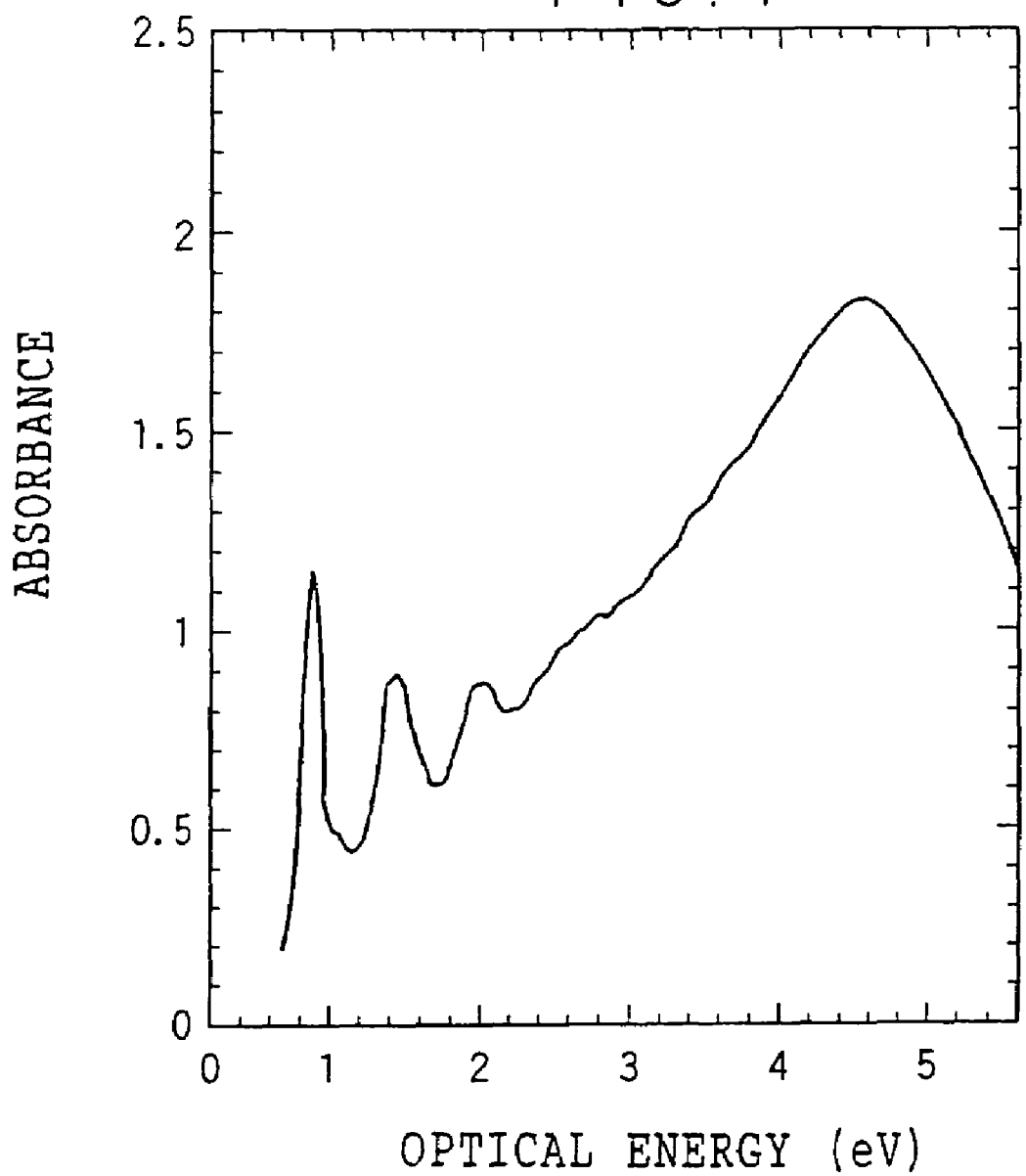
FIG. 1 is a graph showing the absorption property of an SWNT thin film in the infrared region, wherein the optical energy irradiated onto the SWNT thin film is plotted in the abscissa axis and the absorbance of the SWNT thin film is plotted in the ordinate axis.

An optical element and a method for producing the same of the present invention will be described in detail below.

Details of Optical Element and Method for Producing the Same of the Present Invention Carbon nanotubes include a single-wall carbon nanotube having a structure of a tube formed with a sheet of a hexagonal carbon lattice, and a multiwall carbon nanotube having a structure of a multi-layered (multi-walled) tube formed with plural carbon sheets mentioned above. The present invention employs single-wall carbon nanotubes that have a high saturable absorption function.

SWNTs having a diameter of 1.0 to 1.6 nm are preferably used. When the SWNTs having a diameter within the above range are used, the saturable absorption function is effectively exhibited.

An optical element of the present invention utilizes optical absorption of quasi-one-dimensional exciton caused by interband transition, which originates in one-dimensional van Hove singularity of SWNTs in a 1.5 $\mu$m band. The wavelength of this absorption largely varies depending upon the diameter of the SWNT. This is because the energy gap of the SWNT is proportional to a reciprocal of the diameter.

Background absorption other than the above-described absorption of the SWNTs in the 1.5 $\mu$m band is not so large, and thus even if many kinds of SWNTs coexist, the function can be exhibited. This is because, when a certain number of SWNTs providing the absorption with the desired wavelength exist, suitable optical absorption can be obtained, and the other SWNTs do not have a major effect on the absorption. However, if the SWNTs have an extremely wide diameter distribution, the optical absorption due to the undesired SWNTs (this absorption corresponds to tail of $\pi$-plasmon absorption in ultraviolet region and thus has no effect on the saturable absorption) prevails, and thereby the performance of the obtained optical element may be degraded considerably. Accordingly, the SWNTs to be used preferably should have as sharp a diameter distribution as possible which is centered at the diameter of tubes that provide the absorption at the desired wavelength.

A method for producing the SWNTs is not particularly limited, and any conventionally known production methods, such as a thermal decomposition method using a catalyst (a similar method to a vapor growth method), an arc discharge method, and a laser ablation method, may be used. As described above, the SWNTs having a sharp diameter distribution are preferably used in the present invention. At present, it is the laser ablation method and the arc discharge method that realize the sharp diameter distribution. However, SWNTs produced by the arc discharge method contain much catalytic metal (which obviously does not contribute to the performance of the element), and it is thus difficult to purify the SWNTs to high purity.

Accordingly, SWNTs produced by the laser ablation method are preferably used in the present invention. However, there is no problem in using SWNTs produced by a CVD method or the like, as long as the SWNTs are uniform in diameter.

A process for producing, by the laser ablation method, the single-wall carbon nanotubes suitable for the present invention will be exemplified below.

A rod made of mixture of graphite powder and fine powder of nickel and cobalt (mixing ratio: 0.45% in molar ratio, respectively) is prepared as a raw material. The rod is heated to 1250° C. in an electric furnace under 665 hPa (500 Torr) of argon atmosphere, and 350 mJ/pulse of second harmonic pulse of Nd:YAG laser is then irradiated thereto for vaporizing carbon and metallic fine particles, so as to produce single-wall carbon nanotubes (producing operation A).

The above-described production process is only a typical example, and the type of the metal, the type of the gas, the temperature of the electric furnace, the wavelength of the laser, and the like may be changed. Further, single-wall carbon nanotubes produced by methods other than the laser ablation method, for example, a CVD (chemical vapor deposition) method, an arc discharge method, a method of thermal decomposition of carbon monoxide, a template method in which organic molecules are inserted into minute holes so as to be thermally decomposed, and a fullerene-metal codeposition method, may be used.

Samples of the SWNTs after being produced by various methods inevitably contain impurities to some extent, though the extent depends on the production method. In order to obtain an optical element with a good performance, the samples of the SWNTs are preferably purified.

A method of purification is not particularly limited. For example, the samples of the SWNTs produced by the above-described laser ablation method using metallic fine particles of NiCo (producing operation A) can be purified by the following procedure.

1. Heat Treatment in Vacuum

Heat treatment is carried out in vacuum in order to sublimate and remove fullerene contained as impurities. In this heat treatment, a vacuum condition is set around $10^{-4}$ Pa, and a temperature is set around 1250° C.

2. Washing with Toluene and Filtration

After the heat treatment in vacuum, washing is carried out with toluene. At the time of washing, the samples of the SWNTs are dispersed in toluene and stirred. Thereafter, filtration is carried out. At the time of filtration, a mesh, which is sufficiently fine to filter the SWNTs, is used. (Such a mesh is also used for filtration in the following steps.)

3. Dispersion in Ethanol and Filtration

After the washing with toluene and the filtration, dispersion in ethanol is carried out as a pretreatment for producing pure water dispersion liquid. After the dispersion, filtration is carried out.

4. Dispersion in Pure Water

After the dispersion in ethanol and the filtration, the samples are dispersed in pure water to produce pure water dispersion liquid.

5. Addition of Hydrogen Peroxide Water

Hydrogen peroxide water is added to the obtained pure water dispersion liquid such that the amount of hydrogen peroxide is 15% (by volume) as a whole.

6. Reflux Operation and Filtration

In order to burn amorphous carbon contained as impurities, the pure water dispersion liquid, to which the hydrogen peroxide water has been added, is subjected to a reflux operation at 100° C. for 3 hours by a reflux device. Thereafter, filtration is carried out.

7. Washing with Diluted Hydrochloric Acid and Filtration

After the reflux operation and the filtration, the samples are washed with diluted hydrochloric acid to remove the metallic fine particles of NiCo. At the time of washing, the samples of the SWNTs are dispersed in diluted hydrochloric acid and stirred. Thereafter, filtration is carried out.

8. Washing with Aqueous Solution of Sodium Hydroxide and Filtration

After the washing with diluted hydrochloric acid and the filtration, the samples are washed with an aqueous solution of sodium hydroxide for the purposes of neutralizing the residual hydrochloric acid and removing by-product due to the acid treatment. At the time of washing, the samples of the SWNTs are dispersed in an aqueous solution of sodium hydroxide and stirred. Thereafter, filtration is carried out.

9. Kept in Vacuum at 650° C. for 1 Hour

After the washing with an aqueous solution of sodium hydroxide and the filtration, the samples are kept in vacuum (around $10^{-4}$ Pa) at 650° C. for 1 hour for the purpose of removing various solvents contained in the samples.

10. Cooling Down to Ordinary Temperature

The samples are then cooled down to an ordinary temperature so that SWNTs having extremely high purity can be produced. (The above-described steps 1 to 10 are referred to as purification operation B.)

Incidentally, high purity SWNTs of no less than 90% and containing few metallic fine particles were obtained in the operation performed by the present inventors.

Any methods, by which the SWNTs can be purified to have such high purity, can be used. For example, the SWNTs may be carefully heated in the air to burn amorphous carbon, or the purification may be carried out using diluted or concentrated nitric acid solution. The purification of the SWNTs to be used in the present invention may employ one of these methods.

An optical element of the present invention can be obtained by forming a thin film in which the above-described SWNTs are laminated. A method for forming the thin film is not particularly limited as long as the thin film in which the SWNTs are laminated can be finally obtained. Examples of the method include a spray method, an electrophoretic film-forming method, and a polymer dispersion method. The methods for forming the thin film will be described below.

Spray Method

The spray method is a method for forming the thin film by spraying a dispersion liquid in which the SWNTs are dispersed in a dispersion medium.

The purified SWNTs are dispersed in an appropriate dispersion medium to prepare a dispersion liquid. As the dispersion medium, alcohol, dichloroethane, dimethylformamide, or the like can be used. Dichloroethane and dimethylformamide are preferable in that dispersibility is excellent and the quality of the thin film obtained therefrom is satisfactory. However, dichloroethane and dimethylformamide have slightly low volatility, and thus, at the time of spray coating, which will be described later, some efforts are required. Examples of such efforts include maintaining the body to be coated at high temperature, and spending a longer period of time in forming the film by reducing the amount of the dispersion liquid to be sprayed. On the other hand, alcohol is preferable in that volatility is high. Examples of the alcohol include methanol, ethanol, isopropyl alcohol (IPA) and n-propyl alcohol, and among them, ethanol is particularly preferable.

At the time of preparing the dispersion liquid, if necessary, additives such as a surfactant can be used. Surfactants generally used as dispersants are preferably used. Preferable examples thereof include a surfactant having a polarity, and a surfactant having a functional group which can easily bond with SWNTs chemically.

The concentration of the carbon nanotubes in the dispersion liquid is not particularly limited. However, when ethanol is used as the dispersion medium, the concentration is preferably within a range of 1 to 2 mg/ml.

After the SWNTs and the additive added as needed have been introduced in the dispersion medium, it is desirable that the dispersion medium is sufficiently stirred to disperse the SWNTs uniformly. A device used for stirring is not particularly limited. Examples thereof include a blade-type stirrer, a kneader, a roll mill and an ultrasonic disperser, and among them, an ultrasonic disperser is preferable.

The dispersion liquid obtained in the above-described manner is sprayed on a body to be coated. A method for spray coating is not particularly limited, and the spray coating can be carried out with a known device and under known conditions, for example, with an airbrush. When the airbrush is used, it is effective to apply ultrasonic waves to the liquid container of the airbrush to disperse the SWNTs, which easily aggregate, in the dispersion medium such as ethanol.

In the spray coating, if the temperature of the body to be coated is low, the dispersion medium does not quickly evaporate and thus the SWNTs form large aggregates on the surface of the body, and thereby the quality of the film may be degraded. Therefore, it is preferable that hot air is simultaneously blown over the body to be coated by a drier or the body to be coated is directly heated by a heater so as to raise the temperature of the body, such that the sprayed liquid evaporates instantaneously.

Electrophoretic Film-Forming Method

The purified SWNTs are dispersed in the same dispersion medium as in the spray method, for example, in dimethylformamide, with a concentration around 0.4 to 0.5 mg/ml, and 50 wt % sodium hydroxide aqueous solution is added thereto in an amout of about 1% by mass (outer percentage). Then, a pair of electrodes are inserted in this dispersion liquid with a distance of about 1 cm there between, and a DC voltage is applied between the electrodes. The voltage is preferably around 20 V. The electrical conduction therebetween allows for the SWNTs to migrate and deposit on the surface of the positive electrode, so as to form a film thereon. Namely, in this method, a body to be coated is the positive electrode.

Polymer Dispersion Method

The polymer dispersion method is a method in which the purified SWNTs are dispersed in an organic medium solution of a polymer such as polystyrene and the dispersion liquid is applied on a surface of a body to be coated by an arbitrary coating means such as a spin coater. This method provides a uniform film and thus is an effective method. However, this method is disadvantageous in that the chemical stability of the SWNTs may be degraded depending upon the polymer to be used.

As the polymer, any polymers that can form a film can be used. However, polystyrene or the like, which has little influence on the SWNTs, is preferable. With respect to the organic medium, one that can dissolve the polymer to be used should be appropriately selected. The concentration of the polymer in the organic medium solution should be appropriately adjusted in accordance with the coating ability. Further, the concentration of the SWNTs should be appropriately adjusted in accordance with the desired amount of the SWNTs in the thin film.

Other Methods

It is also effective that a body such as a substrate to be coated is inserted into an apparatus for producing the SWNTs so that the SWNTs are directly trapped on the surface of the body. After forming a film, the amorphous carbon (i.e., impurities) is removed by an in-air oxidation method and the metallic catalyst is removed by an in-vacuo high temperature heating and sublimating method. According to this method, the SWNTs can be purified so as to have sufficiently high purity, so that a usable SWNT thin film can be obtained.

The SWNT thin film specific to the present invention can be formed by the above-described methods. The amount of the SWNTs included in the SWNT thin film is determined such that the transmittance at the desired wavelength is preferably around 0.1 to 10% and more preferably around 1% in order that the SWNT thin film exhibits a satisfactory saturable absorption function.

Examples of a body, on which the SWNT thin film is formed, include substrates such as a glass substrate and a quartz substrate, optical materials, and optical elements. When a body to be coated is a substrate, an optical element utilizing the saturable absorption function of the SWNT thin film itself can be produced. When a body to be coated is an optical material or an optical element, an optical element utilizing the optical function of the body as well as the saturable absorption function of the SWNT thin film formed can be produced. Specific examples of the body to be coated will be described later in embodiments.

The SWNT thin film obtained in the above-described way exhibits plural absorption bands in the infrared region. An absorption band with the lowest energy positions near a band of 1.2 to 2 $\mu$m which is an optical communication wavelength region, and the absorption peak wavelength is around 1.78 $\mu$m. Thus, an optical element, in which the SWNT thin film is formed, utilizes the saturable absorption function of the film so as to operate in the communication wavelength region.

In this case where the SWNT thin film is used as a saturable absorption material in the communication wavelength region, the optical element is considered to have the following characteristics as compared with a case using a semiconducting material.

Firstly, the cost of the semiconductor device can be kept extremely low. Raw material of the SWNT is less expensive than a semiconducting material, and the SWNT can be mass-produced. Additionally, since the SWNT does not require a process for forming a quantum structure such as a semiconducting quantum well, which is by a vacuum process, but merely requires that a thin film should be directly formed on a surface of a body such as a substrate to be coated, the SWNT can be easily produced and has a good yield. Accordingly, it is expected that an optical element can be produced at a lower cost by several orders of magnitude as compared with a case using a semiconducting material.

Secondly, the SWNT thin film is formed in an existing optical element on the manufacturing sites so that the saturable absorption function can be easily imparted to the optical element. For example, by forming a SWNT thin film on a surface of a reflecting mirror (a body having a mirror surface), it is easy to produce a mirror having a reflectance that can be varied by the intensity of incident light. In a case using a conventional semiconducting material, it has been required that a quantum well layer is directly formed on the reflecting mirror in a vacuum process. According to the present invention wherein the SWNT thin film is merely formed, the production cost of an existing optical element can be considerably reduced. Furthermore, the saturable absorption film can be formed at portions where it has been unable to form the film, and as a result, an unprecedented optical element may be produced.

Thirdly, a thin film with a large area can be easily obtained. If one attempts to form a thin film having the same saturable absorption function by using a conventional semiconducting material, though the film can be enlarged to some extent, the production cost thereof may increase extremely, since a larger vacuum device is required. On the other hand, in the case of the SWNT thin film, since the film can be thinned by a simple coating method such as a spray coating, the obtained area of the film is not limited and the operation itself for forming the film is easy.

Fourthly, the material is expected to have an extremely high durability and light resistance. This is because the SWNT is structured only with rigid bonds called as sp2 conjugated bonds of carbon atoms, and the electric conductivity is high and heat tends not to accumulate.

Further, since the SWNT is stable in the air and does not burn up to about 500° C., the SWNT can be used at a high temperature in the air. In vacuum, the structure of the SWNT does not change up to 1600° C., the SWNT can be used at an even higher temperature.

Verification of Saturable Absorption Function of SWNT Thin Film

The saturable absorption function of the SWNT thin film formed in the present invention was verified in the following manner by actually forming a SWNT thin film.

SWNTs to be used were produced by the above-described laser ablation method using metallic fine particles of NiCo (producing operation A) and purified by the above-described purification operation B.

A liquid, in which 1 to 2 mg of the above SWNTs were dispersed in 5 ml of ethanol by an ultrasonic disperser, was sprayed on a surface of a quartz substrate to form the SWNT thin film. At this time, hot air was simultaneously blown over the quartz substrate by a drier to increase the temperature of the quartz substrate, such that the sprayed liquid evaporated instantaneously.

Figure 2:
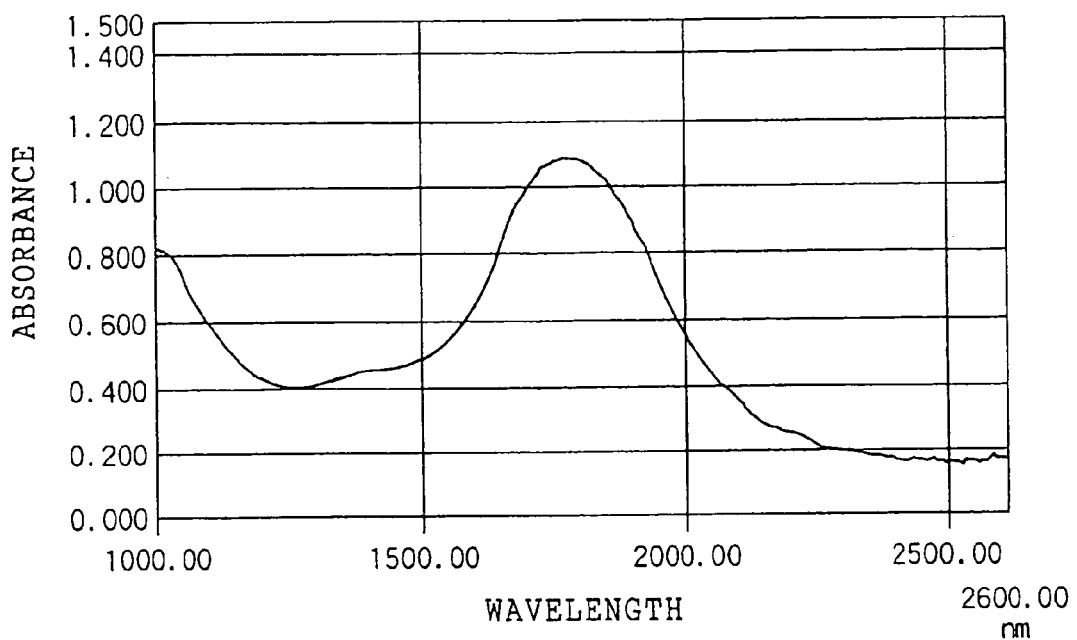
FIG. 2 is a graph, wherein an absorption band with the lowest energy is extracted from FIG. 1 and the optical energy in the abscissa axis of FIG. 1 is replaced by the optical wavelength.

The obtained SWNT thin film was black. As shown in the graph of FIG. 1, wherein the optical energy irradiated onto the SWNT thin film is plotted in the abscissa axis and the absorbance of the SWNT thin film is plotted in the ordinate axis, the SWNT thin film exhibited plural absorption bands in the infrared region. FIG. 2 shows a graph, wherein an absorption band with the lowest energy is extracted from FIG. 1 and the optical energy in the abscissa axis of FIG. 1 is replaced by the optical wavelength. As shown in FIG. 2, the absorption band with the lowest energy positioned near a band of 1.5 to 2 $\mu$m, and the absorption peak wavelength was 1.78 $\mu$m. Raman spectrum and STM observation suggest that the diameters of the SWNTs distribute within a range of 1.2 to 1.6 nm.

The saturable absorption function of the SWNT thin film was measured by a so-called Z-scan method. The saturable absorption is a kind of third order nonlinear optical effect, and is a phenomenon in which many electrons are excited to an upper level upon high intensity irradiation of laser beams corresponding to the absorption wavelength and the electronic excitation is suppressed under such a condition, leading to a temporary decrease of absorption.

FIG. 3 is a schematic setup for explaining the Z-scan method. In the Z-scan method, laser beams L are emitted into a lens 3 via filters such as a UV blocking filter 1 and an ND filter 2, and condensed to an intermediate point (focus X) between the lens 3 and an optical receiver 5. Then, a sample 4 to be measured is moved from the lens 3 side to the optical receiver 5 side along the direction in which the laser beams L proceed. With respect to the position Z of the sample 4, the focus X is set 0 (zero), the position near the lens 3 from the focus X is represented by – (minus), and the position near the optical receiver 5 from the focus X is represented by + (plus). In this way, the intensity of light irradiated onto the sample 4 is maximized when Z is 0, and is gradually reduced when the position moves apart towards the + or − direction. In other words, by merely moving the position Z of the sample 4, the variation in the transmittance depending upon the intensity of light irradiated onto the sample 4 can be measured by the optical receiver 5.

The reduction of the absorbance based on the absorption saturation was estimated from the increase of the transmittance near the focus X by using the obtained SWNT thin film (on the quartz substrate) as the sample 4. A femtosecond laser was used for a laser beam source, and the wavelength to be measured was set to 1.78 $\mu$m, which is the absorption peak of the SWNT thin film, by an optical parametric amplifier (OPA).

Figure 4:
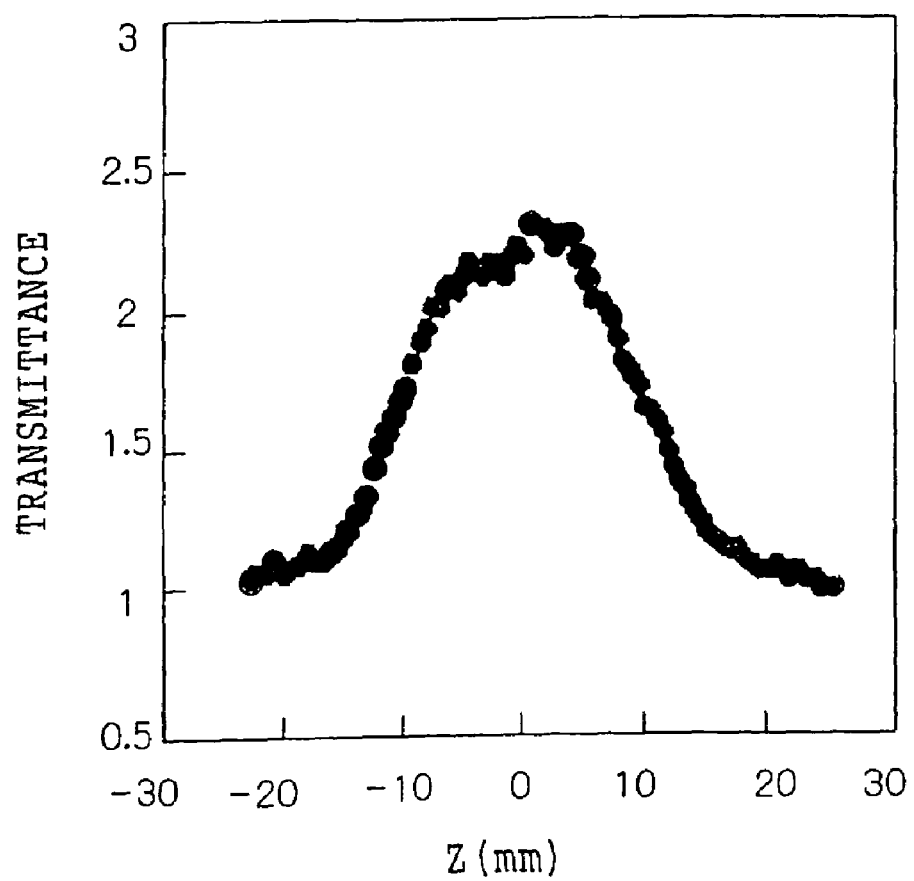
FIG. 4 is a graph showing results of saturable absorption of the SWNT thin film measured by the Z-scan method.

FIG. 4 shows a graph of measurement results. In FIG. 4, the abscissa axis shows the position of the sample (Z), and the ordinate axis shows the transmittance (ΔT/T) normalized by defining the transmittance obtained when Z is −25 (mm) as 1. The increase of the transmittance caused by the absorption variation was observed around the position Z=0 (focus), and it was found that the SWNT thin film causes absorption saturation with absorption bands in the infrared region.

Assuming the thickness of the SWNT is 100 nm, the nonlinear optical constant is estimated to be about $10^{-6}$ esu in view of the intensity of incident light. This value is smaller than that of a semiconducting quantum well (QW), which is a primary material for an optical switching element at present, by just a single order. Therefore, as a performance index, this value holds great promise as a material that can be easily formed into a thin film from a dispersion liquid state. Incidentally, the nonlinear optical constant of phthalocyanine, which can be easily formed into a thin film in the same manner as in the SWNT and which is known as an organic nonlinear optical material having a high nonlinearity, is $10^{-10}$ to $10^{-12}$ esu. Accordingly, it was verified that the SWNT holds great promise as a saturable absorption material in the infrared region.

Embodiments of Optical Element of the Present Invention

Now, the optical element of the present invention will be explained with several preferable embodiments.

(1) Optical Switch

In the same manner as in the method described in the above section "Verification of saturable absorption function of SWNT thin film", the SWNT thin film was formed on a glass substrate, so as to produce an optical element exhibiting an optical switching operation. The absorption peak wavelength was 1.78 $\mu$m, and the absorbance was 1.3.

Figure 5:
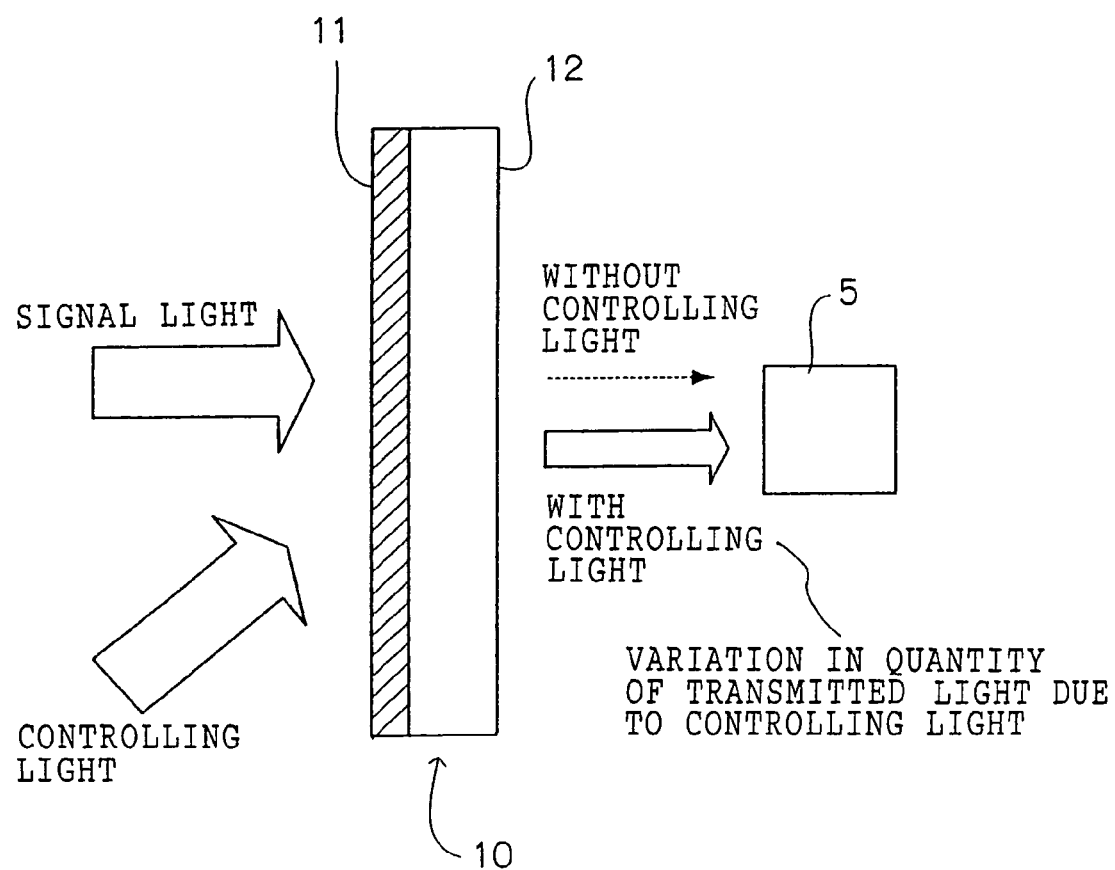
FIG. 5 is a schematic setup showing outline of an experiment in which the optical element of the present invention is operated as a variable transmittance type optical switch.

The obtained optical element was operated as a variable transmittance type optical switch. The outline of this experiment is shown in FIG. 5. In FIG. 5, reference numeral 10 indicates an optical element having an optical switching function, and the optical element 10 is structured by forming an SWNT thin film 11 on a surface of a glass substrate 12. The wavelengths of controlling light and signal light were both set to 1.78 $\mu$m, and the variation in quantity of transmitted light due to the presence or absence of the controlling light was measured by a power meter serving as an optical receiver 5. The controlling light and the signal light were produced by converting the wavelength of femtosecond laser beams with an OPA. The pulse width was 200 fs, and the cycle period was 1 kHz. As a result of the experiment, when the optical intensity of the controlling light was 0.36 mJ/cm$^2$·pulse, it was observed that the quantity of transmitted light increased by 60%. This verified that the SWNT thin film 11 served as an optical switch utilizing the saturable absorption. Accordingly, the optical element in this embodiment can be used as an optical element (optical switch) having the optical switching function in a band of 1.2 to 2.0 $\mu$m.

(2) Saturable Absorption Mirror

Figure 6:
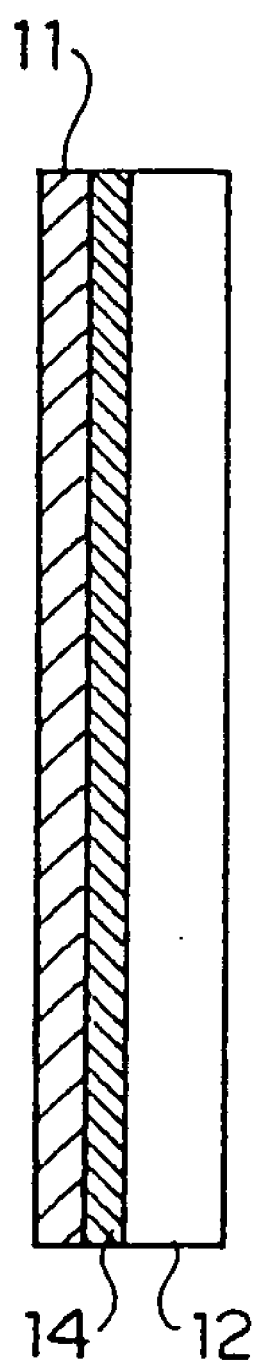
FIG. 6 is a schematic cross-sectional view showing an implementation of an optical element having a function of a saturable absorption mirror.

As shown in FIG. 6, in the same manner as in the method described in the above section "Verification of saturable absorption function of SWNT thin film", an SWNT thin film 11 was formed on a surface of an Ag-coat mirror (optical element), in which a surface of a glass substrate 12 was coated with a silver (Ag) mirror layer 14, so as to produce an optical element having a function of a saturable absorption mirror.

With respect to the obtained optical element, dependence of the reflecting light intensity on the irradiating light intensity was measured. As a result, with irradiation of laser beams having a wavelength of 1.78 $\mu$m and a pulse width of 200 fs, an increase in the reflecting light intensity was observed when the irradiating light intensity more or less exceeds 10 $\mu$J/cm$^2$·pulse. When the irradiating light intensity was 300 $\mu$J/cm$^2$·pulse, the reflecting light intensity was approximately doubled as compared with that obtained when the irradiating light intensity was 10 $\mu$J/cm$^2$·pulse. This verified that the Ag-coat mirror, on which the SWNT thin film 11 was formed, served as a saturable absorption mirror. Accordingly, the optical element in this embodiment can be used as an optical element having the function of the saturable absorption mirror in a band of 1.2 to 2.0 $\mu$m.

(3) Waveform Shaper

When the SWNT thin film having the saturable absorption function is utilized, an optical element having a function of waveform shaping, e.g., shortening a time width of an incident light pulse, can be formed. The structure of the optical element is basically the same as in the above section "(1) Optical switch".

FIG. 7 shows a graph for explaining the principle of waveform shaping in the case where the optical element of the present invention is used as a waveform shaper having a function of waveform shaping. In the graph of FIG. 7, the abscissa axis shows time, and the ordinate axis shows the optical intensity of an incident light pulse. On the time axis, the optical element of the present invention has a low transmittance near both ends of the pulse where the optical intensity is low, and has a high transmittance near a center portion of the pulse where the optical intensity is high. As a result, the both ends of the pulse that has transmitted through the SWNT thin film are cut (or reduced) so that the pulse has a shorter time width than the original pulse.

A waveform shaping experiment was carried out by an infrared OPA system. As laser beams in the infrared OPA system, infrared light having a pulse width of 4 to 6 ns and a cycle period of 10 Hz can be lased. In order to obtain a satisfactory peak optical intensity, measurement was carried out by condensing output light having a wavelength of 1.78 $\mu$m and an optical intensity of 3 mW into 50 $\mu$m$\phi$ on the SWNT thin film. As a result of observing, with a photodetector, the time width of the light which had transmitted through the SWNT thin film, the time width was shortened by about 30% than the original pulse. This verified that the SWNT thin film served as a waveform shaper. Accordingly, the optical element in this embodiment can be used as an optical element having the function of waveform shaping in a band of 1.2 to 2.0 $\mu$m.

(4) Ultra-high Resolution Optical Disk

In the case where the optical element of the present invention is used as the waveform shaper, the pulse width on the time axis can be shortened. Now, in a case where the optical element of the present invention is used as an ultra-high resolution optical disk by utilizing the same saturable absorption function, a spatial beam diameter can be reduced.

Figure 8:
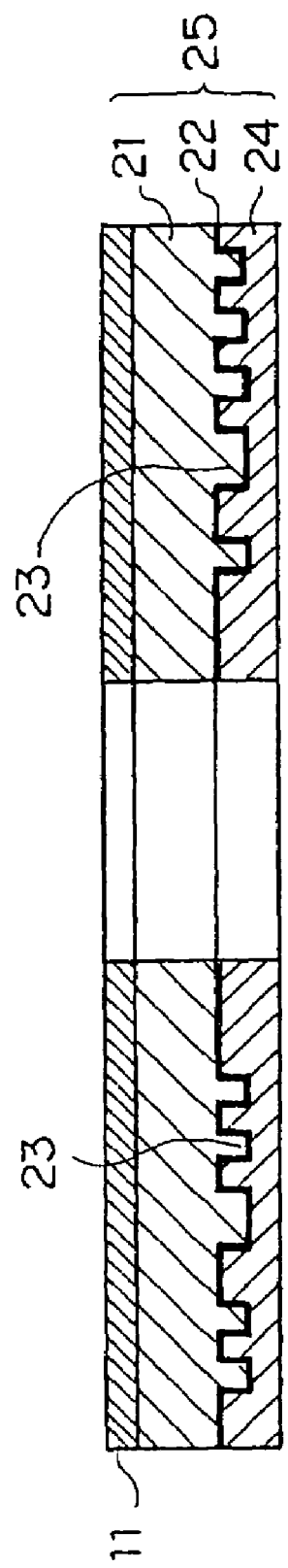
FIG. 8 is a schematic cross-sectional view showing an implementation of an optical element having a function of an ultra-high resolution optical disk.

FIG. 8 is a schematic cross-sectional view showing an optical element of the present invention having a function of an ultra-high resolution optical disk, which reduces a spatial beam diameter to realize ultra-high resolution. In FIG. 8, pits 23 are formed in one side surface of a substrate 21, which is made of a plastic material such as a polycarbonate resin, an acrylic resin, or a polyolefin resin. Then, a reflective layer 22, which is made of a metal such as gold, silver, aluminum, platinum or copper, or of an alloy containing these metals, is provided thereon (not in the gravitational direction but in the laminating direction), and a protective layer 24 is further provided thereon (in the laminating direction). The substrate 21, the reflective layer 22 and the protective layer 24 form an optical disk 25, and an SWNT thin film 11 is formed on a surface of the optical disk 25 on the substrate 21 side. (Hereinafter, this surface of the optical disk 25 is referred to as a "recording surface". In the present invention, the "recording surface" is a surface into which irradiation beams are emitted.) The layer structure of the optical disk 25 is not limited to that shown in FIG. 8.

Since laser beams have a Gauss type beam pattern, the optical intensity at a center portion thereof is higher than that at a peripheral portion thereof. Therefore, if the SWNT thin film 11 is formed on the recording surface of the optical disk 25, when laser beams are irradiated from the recording surface side, only a part of a center portion of the irradiation beams transmits due to the saturable absorption function of the SWNT thin film 11. This effect enables a spot, which is smaller than a condensing limit of the beams, to be formed on the recording surface of the optical disk 25. Such an optical disk having this function is referred to as an ultra-high resolution optical disk.

With respect to the optical element shown in FIG. 8 (ultra-high resolution optical disk) in which the SWNT thin film 11 was formed in the same manner as in the method described in the above section "Verification of saturable absorption function of SWNT thin film", the effect of the reduced beam diameter was observed. The infrared OPA system, which was used for the above-described waveform shaping experiment, was used for irradiation of laser beams. Output light having a wavelength of 1.78 $\mu$m was condensed onto a surface of the SWNT thin film 11, observed by a beam profiler, and compared to the original beam diameter. As a result, the beam pattern changed and the luminance only at the center portion of the beams increased selectively when the irradiating light intensity more or less exceeded 1 mW. Under optimal conditions (about 3 mW), the radius of the beam diameter could be reduced to about 60% of the original one. This verified that the SWNT thin film served as a material for an ultra-high resolution optical disk. Accordingly, the optical element in this embodiment can be used as an optical element having the function of the ultra-high resolution optical disk.

In this way, according to the structure of the present invention utilizing the saturable absorption function of the SWNT thin film, an active element such as the optical switch, in which signal light can be actively controlled by extraneous controlling light, and a passive element such as the saturable absorption mirror, in which signal light is passively controlled by the signal light itself, can be produced arbitrarily.

Four embodiments of the optical element of the present invention utilizing the saturable absorption function of the SWNT thin film have been described above. However, the present invention is not limited to the embodiments described above, and is generally applicable to optical elements produced by utilizing the saturable absorption function due to resonant excitation of the SWNT thin film.

INDUSTRIAL APPLICABILITY

As described above, according to the present invention, the SWNT is applied to an optical element so that a nonlinear optical element, which can operate in an optical communication wavelength region and which is extremely inexpensive and efficient, and a method for producing the optical element can be provided.

What is claimed is:

1. An optical element comprising a thin film, in which single-wall carbon nanotubes are laminated, and utilizing a saturable absorption function of the single-wall carbon nanotubes.

2. The optical element of claim 1, wherein the thin film is formed on a surface of a substrate.

3. The optical element according to claim 1, wherein the thin film is formed on a surface of an optical material or on a surface of an optical element.

4. The optical element according to claim 1, wherein the thin film is formed by spraying a dispersion liquid in which the single-wall carbon nanotubes are dispersed in a dispersion medium.

5. The optical element according to claim 4, wherein the dispersion medium is alcohol.

6. The optical element according to claim 1, utilizing saturable absorption of the single-wall carbon nanotubes in a band of 1.2 to 2.0 $\mu$m.

7. The optical element according to claim 6, wherein each of the single-wall carbon nanotubes has a diameter of 1.0 to 1.6 nm.

8. The optical element according to claim 1, exhibiting an optical switching operation due to transmittance variation caused by saturable absorption of the thin film.

9. The optical element according to claim 8, having an optical switching function in a band of 1.2 to 2.0 $\mu$m.

10. The optical element according to claim 1, wherein the thin film is formed on a mirror surface so that the optical element has a function of a saturable absorption mirror.

11. The optical element according to claim 10, having the function of the saturable absorption mirror in a band of 1.2 to 2.0 $\mu$m.

12. The optical element according to claim 1, having a function of waveform shaping.

13. The optical element according to claim 12, having the function of waveform shaping in a band of 1.2 to 2.0 $\mu$m.

14. The optical element according to claim 1, wherein the thin film is formed on a recording surface of an optical disk so that the optical element has a function of an ultra-high resolution optical disk.

15. A method for producing an optical element comprising a thin film, in which single-wall carbon nanotubes are laminated, and utilizing a saturable absorption function of the single-wall carbon nanotubes,
   wherein the thin film is formed by spraying, to a body to be coated, a dispersion liquid prepared by dispersing the single-wall carbon nanotubes in a dispersion medium.

16. The method for producing an optical element according to claim 15, wherein the body to be coated is a substrate.

17. The method for producing an optical element according to claim 15, wherein the body to be coated is an optical material or an optical element.

18. The method for producing an optical element according to claim 15, wherein the dispersion medium is alcohol.

19. The method for producing an optical element according to claim 15, wherein each of the single-wall carbon nanotubes has a diameter of 1.0 to 1.6 nm.

* * * * *